(12) United States Patent
Emadi et al.

(10) Patent No.: US 12,416,708 B2
(45) Date of Patent: Sep. 16, 2025

(54) PHASED ARRAY FREQUENCY MODULATED CONTINUOUS WAVE RADAR WITH NON-UNIFORM SIGNAL DELAY

(71) Applicant: Zadar Labs, Inc., Santa Clara, CA (US)

(72) Inventors: Mohammad Emadi, Santa Clara, CA (US); Ali Mostajeran, Santa Clara, CA (US); Mahmoud Saadat, Santa Clara, CA (US); David Wu, Santa Clara, CA (US)

(73) Assignee: Zadar Labs, Inc., Campbell, CA (US)

( * ) Notice: Subject to any disclaimer, the term of this patent is extended or adjusted under 35 U.S.C. 154(b) by 381 days.

(21) Appl. No.: 18/071,495

(22) Filed: Nov. 29, 2022

(65) Prior Publication Data
US 2023/0176184 A1    Jun. 8, 2023

Related U.S. Application Data

(60) Provisional application No. 63/285,349, filed on Dec. 2, 2021.

(51) Int. Cl.
*G01S 7/40* (2006.01)
*G01S 7/35* (2006.01)
*G01S 13/02* (2006.01)

(52) U.S. Cl.
CPC ............... *G01S 7/40* (2013.01); *G01S 7/35* (2013.01); *G01S 7/4021* (2013.01); *G01S 2013/0263* (2013.01)

(58) Field of Classification Search
CPC .. G01S 7/40; G01S 7/35; G01S 7/4021; G01S 2013/0263; G01S 7/4026; G01S 2013/0245; G01S 13/42; G01S 13/343
See application file for complete search history.

(56) References Cited

U.S. PATENT DOCUMENTS 9,470,782 B2    10/2016    Millar et al.
10,921,436 B2    2/2021    Jansen
(Continued)

FOREIGN PATENT DOCUMENTS

EP    3015880 B1    2/2020

OTHER PUBLICATIONS

Kishigami et al., "20 Maximum Likelihood Angle Estimation for MIMO Radar with Unequally Spaced L-shaped Arrays," 2018 15th European Radar Conference (Eu RAD), Madrid, Spain, 2018, pp. 130-133 (Year 2018).

(Continued)

*Primary Examiner* — Vladimir Magloire
*Assistant Examiner* — Naomi M Wolford
(74) *Attorney, Agent, or Firm* — UTULAW PC (57) ABSTRACT

A phased array frequency-modulated continuous-wave (FMCW) radar configured to operate to transmit, using at least one antenna, a calibration signal, to receive, using the antenna, a reflection of the at least one calibration signal from a calibration target, to determine, based on the at least one calibration signal, a phase shift factor, to estimate, based on the phase shift factor, a transmitter trace distance and a receiver trace distance, to transmit, using the antenna, at least one target signal, to receive, using the antenna, a reflection of the at least one target signal from a target, and to determine, based on the at least one target signal and the transmitter trace distance and the receiver trace distance, a range of the target.

18 Claims, 4 Drawing Sheets

(56) References Cited

U.S. PATENT DOCUMENTS

| | | |
|---|---|---|
| 11,131,749 B2 | 9/2021 | Loesch |
| 2013/0016003 A1* | 1/2013 | Stirling-Gallacher ... H01Q 3/26 342/372 |
| 2016/0131752 A1* | 5/2016 | Jansen .................... G01S 13/42 342/27 |
| 2017/0131394 A1 | 5/2017 | Roger et al. |
| 2018/0348343 A1 | 12/2018 | Achour et al. |
| 2020/0292663 A1 | 9/2020 | Bai et al. |

OTHER PUBLICATIONS

Tayem et al., "L-shape 2-dimensional arrival angle estimation with propagator method," in IEEE Transactions on Antennas and Propagation, vol. 53, No. 5, pp. 1622-1630, May 2005 (Year: 2005).

Di Serio et al., "2-D MIMO Radar: A Method for Array Performance Assessment and Design of a Planar Antenna Array," in IEEE Transactions on Antennas and Propagation, vol. 68, No. 6, pp. 4604-4616, Jun. 2020 (Year: 2020).

Non-Final Office Action issued Feb. 14, 2025 in U.S. Appl. No. 18/071,512.

Non-Final Office Action issued Jan. 3, 2025 in U.S. Appl. No. 18/071,525.

\* cited by examiner

PHASED ARRAY FREQUENCY MODULATED CONTINUOUS WAVE RADAR WITH NON-UNIFORM SIGNAL DELAY

BACKGROUND

Phased array, or FMCW (frequency modulated continuous wave) radars may have many transmitting and receiving antenna elements that require connection to the RF (radiofrequency) transceiver(s). In general, uniform trace-length between the transceiver(s) and the antenna element(s) is required to minimize phase distortion with regard to transmitter beamforming, digital or analog beamforming, or MIMO (multiple-input and multiple-output) beamforming.

Implementation of uniform trace-length in the system design can result in long trace-length and/or crossed traces as well as various other non-optimal designs which typically result in significant trace loss and reduction of the signal to noise ratio. Non-uniform LO (local oscillator) path(s) in the system design can result in similar effects as non-uniform antenna element trace-lengths.

Also another source of the problem is to have different delays between different LOs (or Chirps) paths on any radar due to different transmitters and receivers on the MIMO or non-MIMO modes. This effect is very similar to having different trace length between different channels. There may be other system design elements that cause non-uniform signal delay in a phased array radar and will result in signal phase distortion and other described effects.

Hence, there is a need for a method to eliminate the phase dependencies of the system based on a target's range, carrier frequency and slope of the transmitted LFM (linear frequency modulated) signal. To this end, the instant application describes an adaptive calibration technique to compensate for non-uniform trace or antenna phase effects between antenna element(s), transceiver(s) and LO(s). Other aspects and advantages of the invention will become apparent from the following detailed description taken in conjunction with the accompanying drawings which illustrate, by way of example, the principles of the invention.

BRIEF DESCRIPTION OF THE DRAWINGS

The drawing figures depict one or more implementations in accordance with the present teachings, by way of example only, not by way of limitation. In the figures, like reference numerals refer to the same or similar elements. Furthermore, it should be understood that the drawings are not necessarily to scale.

SUMMARY

In one general aspect, the instant application describes a phased array frequency-modulated continuous-wave (FMCW) radar system. The system includes a process and a memory coupled to the processor. The memory is configured to store executable instructions, where the instructions, when executed by the processor, cause the processor to (a) transmit, using one or more antennas, at least one signal; (b) receive, using the one or more antennas, a reflection of the at least one signal from a target; (c) estimate, based on the at least one signal, a fixed phase offset factor; (d) estimate, based on the at least one signal, a range offset factor; and (e) estimate, based on the fixed phase and range offset factors, a non-uniform phase offset factor.

The above general aspect may include one or more of the following features. The instructions when executed by the processor may further cause the processor to perform, based on the range of the target, beamforming techniques. The determining of the phase and range offset factors may be further based on at least one of (a) a temporal characteristic of the transmission of the at least one signal; and (b) a temporal characteristic of the reception of the at least one signal. The target may be a known distance away from the one or more antenna elements.

In another general aspect, the instant application describes a method for operating a phased array frequency-modulated continuous-wave (FMCW) radar system. The method includes steps of (a) transmitting, using one or more antenna elements, at least one signal; (b) receiving, using one or more antenna elements, a reflection of the at least one signal from a target; (c) estimating, based on the at least one signal, a fixed phase offset factor; (d) estimating, based on the at least one, a range offset factor; and (e) estimating, based on the fixed phase and range offset factors, a phase offset factor.

The above general method aspect may include one or more of the following features. The method may further include a step of performing, based on the range of the target, beamforming. The determining of the phase and range offset factors may be further based on at least one of: (a) a temporal characteristic of the transmission of the at least one signal; and a temporal characteristic of the reception of the at least on signal. The target may be a known distance away from the one or more antenna elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Using radar systems to track targets moving through an area is well understood and has been utilized for years. However, as discussed herein, current systems suffer from the issue of requiring uniform trace-length between a transceiver(s) and the various antenna elements. In addition to the waste created by doing length matching, identical trace-lengths may also result in long trace-lengths and/or crossed traces as well as various other non-optimal designs that may result in significant trace loss and reduction of the signal to noise ratio.

Accordingly, discussed herein are systems and methods that utilize a calibration technique to eliminate the phase dependencies of the system based on a target's range, carrier frequency, and slope of the transmitted linear frequency modulated (LFM) signal. As discussed in greater detail below, by transmitting a preliminary (i.e., test) signal toward a target that is a known distance away and/or has various known characteristics (e.g., size, shape, etc.) the non-uniform trace lengths of each antenna element can be estimated and offset via a compensation value.

Figure 1:
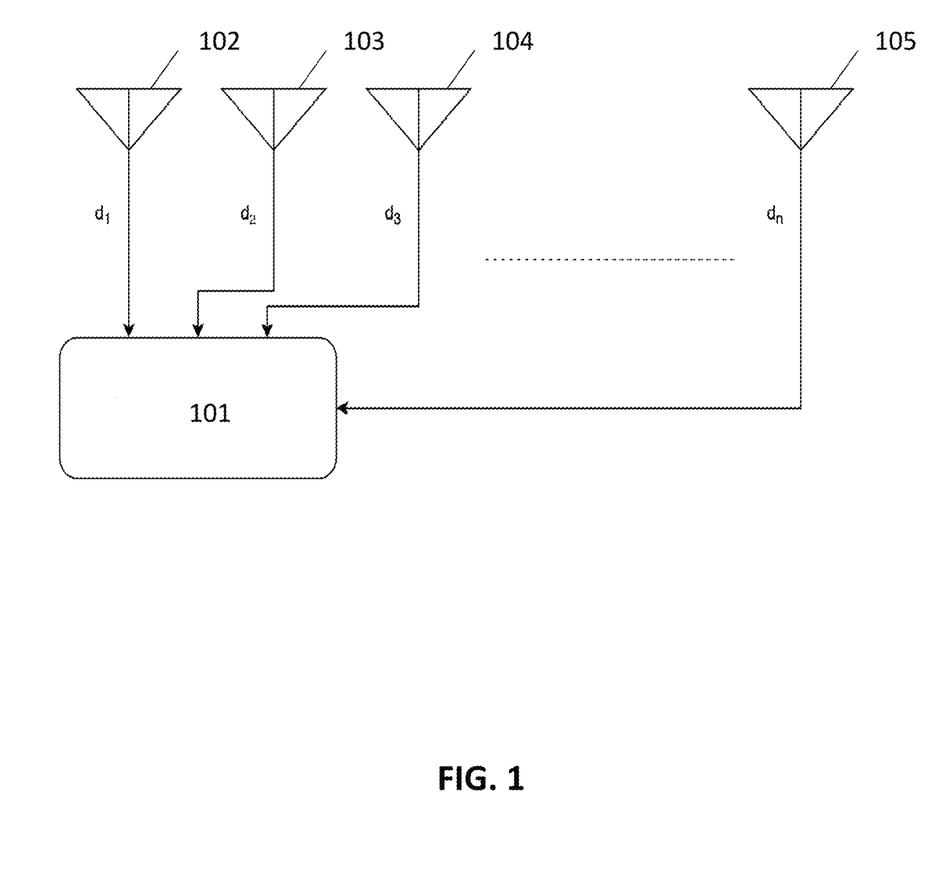
FIG. 1 is a conceptual diagram illustrating an example antenna array.

Specifically, FIG. 1 illustrates an example embodiment having a plurality of antenna elements (102, 103, 104, and 105) connected to a local oscillator 101. In some embodiments, and as shown, each antenna element (e.g., 102-105) is connected to the local oscillator 101 via a wire with known length (i.e., $d_1$, $d_2$, $d_3$, . . . $d_n$). As should be understood by one of ordinary skill in the art, every local oscillator (i.e., 101) will have a mixer input signal. By way of non-limiting example, we will assume a local mixer (LO) input signal is applied based on the following equation:

$$LO = \cos\left(2 \times \pi \times \left(f_c + \frac{S}{2} \times t\right) \times t\right) \quad (1)$$

Where $f_c$ is the carrier frequency, t is the time, and S is the slope of the FMCW signal, which is equal to $$\frac{BW}{T},$$

where BW is the bandwidth of the wave and T is the chirp time duration. Based on the local mixer input signal (e.g., equation (1)) the received signal from the different antenna elements (102, 103, 104, 105, and 10n) may be equal to:

$$Rx_{102} = \cos\left(2 \times \pi \times \left(f_c + \frac{S}{2} \times (t-\tau)\right) \times (t-\tau) + 2\pi d_2 \frac{f_c + \frac{S}{2} \times (t-\tau)}{c}\right) \quad (1)$$

$$Rx_{103} = \cos\left(2 \times \pi \times \left(f_c + \frac{S}{2} \times (t-\tau)\right) \times (t-\tau) + 2\pi d_3 \frac{f_c + \frac{S}{2} \times (t-\tau)}{c}\right) \quad (2)$$

$$Rx_{104} = \cos\left(2 \times \pi \times \left(f_c + \frac{S}{2} \times (t-\tau)\right) \times (t-\tau) + 2\pi d_4 \frac{f_c + \frac{S}{2} \times (t-\tau)}{c}\right) \quad (3)$$

$$Rx_{105} = \cos\left(2 \times \pi \times \left(f_c + \frac{S}{2} \times (t-\tau)\right) \times (t-\tau) + 2\pi d_5 \frac{f_c + \frac{S}{2} \times (t-\tau)}{c}\right) \quad (4)$$

$$Rx_{10n} = \cos\left(2 \times \pi \times \left(f_c + \frac{S}{2} \times (t-\tau)\right) \times (t-\tau) + 2\pi d_n \frac{f_c + \frac{S}{2} \times (t-\tau)}{c}\right) \quad (5)$$

Where c is the speed of the wave inside the substrate material and t is the delay of the received signal due to the range delay which is equal to $$\frac{2R}{c}$$

where R is the desired target distance to the radar.

Figure 2:
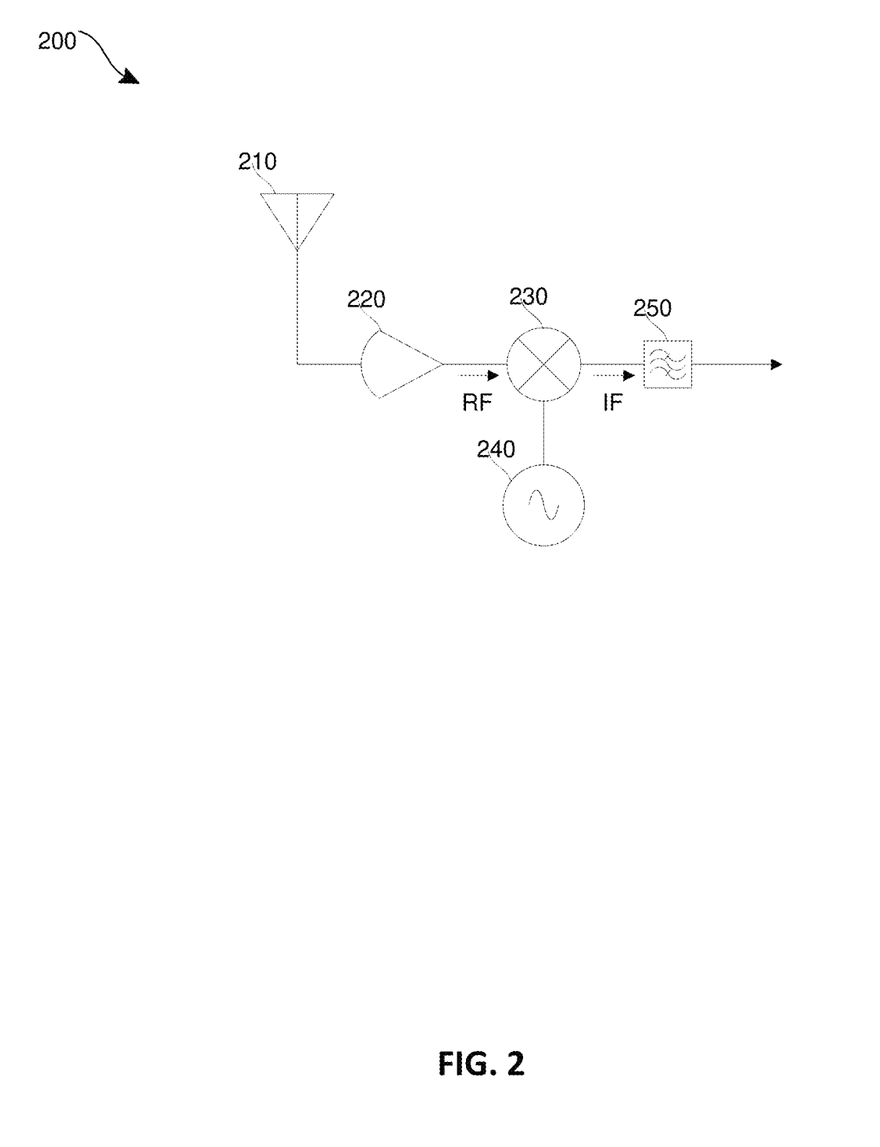
FIG. 2 is a conceptual diagram illustrating an example radio frequency conversion using a mixer.

Referring briefly to FIG. 2, an example implementation system 200 is shown having a receiving antenna 210, which as discussed herein receives the echoes or chirps that are reflected off the target object. In some embodiments, and as shown, the received signal(s) (e.g., equations (2), (3), and (4)) may be passed through an amplifier 220 (e.g., a low-noise amplifier) and then fed to Radio Frequency (RF) mixer 230. The RF mixer 230 may then use a local oscillation signal 240 to convert the RF to the Intermediate Frequency (IF). In a further implementation, once the IF is generated, it may be filtered through a band pass filter (BPF) 250.

Thus, in some embodiments, once the received signals (e.g., equations (1-4)) are multiplied with the FMCW's LO signal (e.g., equation (1)), the resulting associated IF may, in the current non-limiting example be equal to:

$$RxIF_{102} = \cos(\underbrace{2\pi S\tau t}_{\text{Term 1}} - \underbrace{\pi S\tau^2}_{\text{Term 2}} + \underbrace{2\pi f_c \tau}_{\text{Term 3}} - \underbrace{2\pi \frac{d_1 f_c}{c}}_{\text{Term 4}} + \underbrace{2\pi \frac{d_1 S\tau}{2c}}_{\text{Term 5}} - \underbrace{2\pi \frac{d_1 St}{2c}}_{\text{Term 6}}) \quad (6)$$

$$RxIF_{103} = \cos(\underbrace{2\pi S\tau t}_{\text{Term 1}} - \underbrace{\pi S\tau^2}_{\text{Term 2}} + \underbrace{2\pi f_c \tau}_{\text{Term 3}} - \underbrace{2\pi \frac{d_2 f_c}{c}}_{\text{Term 4}} + \underbrace{2\pi \frac{d_2 S\tau}{2c}}_{\text{Term 5}} - \underbrace{2\pi \frac{d_2 St}{2c}}_{\text{Term 6}}) \quad (7)$$

$$RxIF_{10n} = \cos(\underbrace{2\pi S\tau t}_{\text{Term 1}} - \underbrace{\pi S\tau^2}_{\text{Term 2}} + \underbrace{2\pi f_c \tau}_{\text{Term 3}} - \underbrace{2\pi \frac{d_n f_c}{c}}_{\text{Term 4}} + \underbrace{2\pi \frac{d_n S\tau}{2c}}_{\text{Term 5}} - \underbrace{2\pi \frac{d_n St}{2c}}_{\text{Term 6}}) \quad (8)$$

Accordingly, based on the current non-limiting example, Terms 1, 2, and 3 of equations (5), (6), and (7) do not include any signal delay dependencies, and thus can be resolved using existing and/or known techniques. However, Terms 4, 5, and 6 are dependent on antenna-specific delays (i.e., $d_1$ and $d_2$). Comparing Term 6 to Term 1, it can be said that because the value of do is much smaller than R, and thus, some embodiments may ignore term 6 whereas other embodiments may compensate for term 6 using a range offset. Term 4 represents the fixed phase difference between antenna elements and requires compensation. Term 5 introduces a phase offset which is related to both the target distance and the slope of the chirp. It should be understood that for targets at different ranges, the phase offset may vary for different Rx(s). Term 6 will result in a range offset and will also require compensation.

Figure 3:
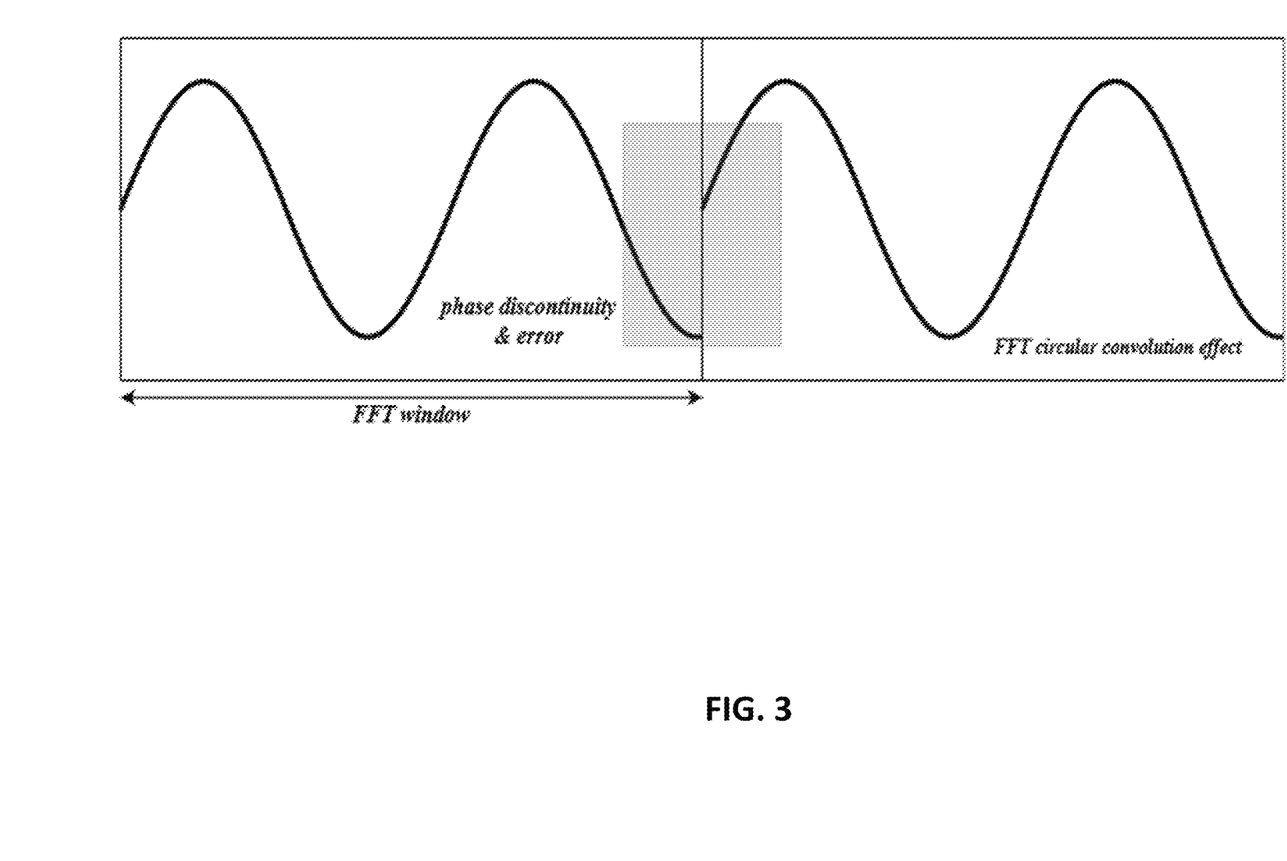
FIG. 3 is an illustrative diagram of a phase error being present in a wave. a phase error present in the wav FIG. 4 a flow diagram illustrating an implementation of a process for using a phased array frequency-modulated continuous-wave (FMCW) radar system.

Although Terms 4 and 6 do not contain any variables with dependency on target location, terms 4 and 6 are still dependent on the signal processing window size and range resolution of the radar, as shown in FIG. 3. Thus, it is not a simple process to compensate for Terms 4 and 6 and based on these factors it is expected there will regularly be a phase error present in the wave, as shown in FIG. 3. Moreover, in some embodiments, the type of signal processing window may further introduce phase calibration error.

Figure 4:
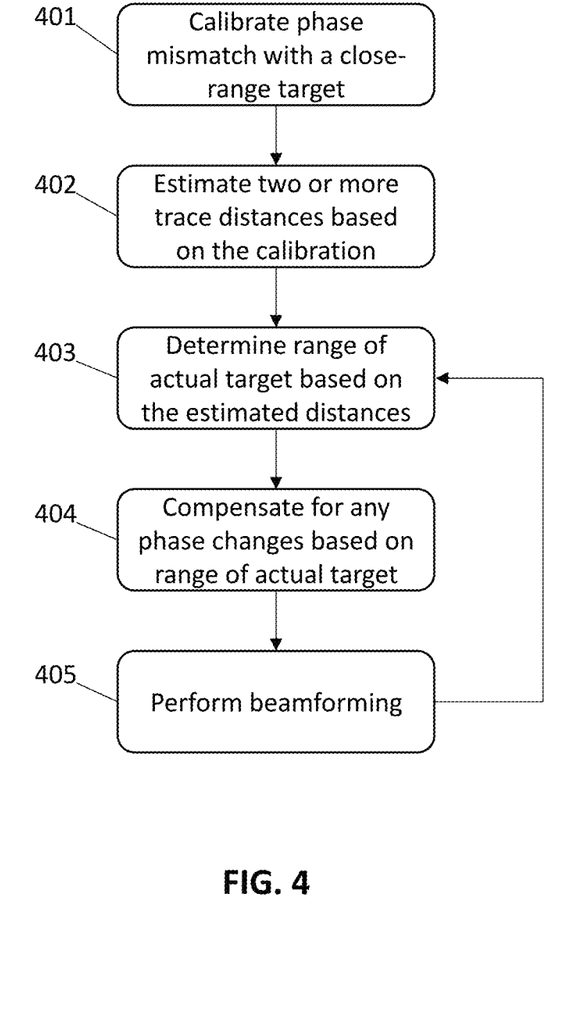

Accordingly, in some embodiments, a method, such as shown in FIG. 4, may be used to estimate and therefore compensate for these errors. Referring now to FIG. 4, in some embodiments, the method may identify a calibration target (i.e., a target of known or estimated specifications) at a close distance (e.g., —1-10 meters) from the broadside of the radar antenna elements (Step 401). In a further embodiment, the method may use a zero-padding technique prior to performing the FFT analysis of the received signal from the calibration target in order to estimate the trace distances (e.g., Term 6 for each antenna element) (Step 402) based on a phase shift factor.

The phase shift factor may be calculated or measured in various ways, such as, for example, the method may evaluate a temporal characteristic of the transmission of the at least one calibration signal (i.e., the signal sent to the calibration target) and/or evaluate a temporal characteristic of the reception of the at least one calibration signal. Once the trace distances are known/estimated 402, the method may then compensate for the estimation of Term 6 with/without the zero-padding and estimate Term 4 to determine the range of the actual target (Step 403).

Turning now to Term 5, based on the above, it should be understood that Term 5 is dependent on the range of the target (i.e., R) as well as the total delay caused by the trace distance (i.e., $d_n$). In some embodiments, the method may perform estimation of Term 5 recursively after Term 4 and Term 6 are estimated. Moreover, based on equations 5, 6, and 7, the method may then determine the Term 5 phase difference for each antenna element, and based on the phase difference compensate for the range of the actual target (Step 404), by, for example, using equation (8):

$$2\pi \frac{(d_1 - d_n)S\tau}{2c} \quad (9)$$

Once the compensation is complete (Step 404), the method may, in some embodiments, perform beamforming techniques 405. In a further embodiment, and as shown in FIG. 4, steps 403, 404, and 405 may be iteratively performed based on various factors (e.g., the number of targets, speed of the targets, range of targets, etc.).

The detailed examples of systems, devices, and techniques described in connection with FIGS. 1-4 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-4 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module, such as, for example, any component shown in FIG. 2 or the local oscillator at 101 may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method shown in FIG. 4 may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

The invention claimed is:

1. A phased array frequency-modulated continuous-wave (FMCW) radar system, comprising:
   a processor; and
   a memory, coupled to the processor, configured to store executable instructions, wherein the instructions, when executed by the processor, cause the processor to:
   transmit, using a plurality of antennas, at least one calibration signal via a transmitter of the radar system, wherein the plurality of antennas are respectively connected to the transmitter by wiring connections having respective transmitter trace lengths $Dt1, \ldots Dtn$ between each of the plurality of antennas and the transmitter;
   receive, using the plurality of antennas, a reflection of the at least one calibration signal from a calibration target via a receiver of the radar system, wherein the plurality of antennas are respectively connected to the receiver by wiring connections having respective receiver trace lengths $Dr1, \ldots Drn$ between each of the plurality of antennas and the receiver;
   determine, based on the at least one calibration signal, a phase shift factor for each of the plurality of antennas;
   estimate, based on the phase shift factor, the transmitter trace distances $Dt1, \ldots Dtn$ and the receiver trace distances $Dr1, \ldots Drn$;
   transmit, using the plurality of antennas, at least one target signal toward a target other than the calibration target;
   receive, using the plurality of antennas, a reflection of the at least one target signal from the target; and
   determine, based on the at least one target signal and the estimated transmitter trace distances and the estimated receiver trace distances, a range of the target.

2. The system of claim 1, wherein the instructions when executed by the processor, further cause the processor to perform, based on the range of the target, beamforming.

3. The system of claim 1, wherein the determining of the phase shift factor is further based on at least one of:
   a temporal characteristic of transmission of the at least one calibration signal; and
   a temporal characteristic of reception of the at least one calibration signal.

4. The system of claim 1, wherein the calibration target is a known distance away from the plurality of antennas.

5. The system of claim 1, wherein the calibration target has at least one of a known size and a known shape.

6. The system of claim 1, wherein the plurality of antennas comprises at least two antennas.

7. The system of claim 1, wherein the plurality of antennas comprises less than sixty antennas.

8. The system of claim 1, wherein the transmitter and the receiver of the radar system are located in a transceiver.

9. The system of claim 8, wherein the transmitter and the receiver in the transceiver share a common local oscillator, and wherein the transmitter trace distances and the receiver trace distances are the respective distances of each of the antennas and the common local oscillator of the transceiver so that, for each antenna, the respective transmitter trace distance and the receiver trace distance are identical to one another.

10. A phased array frequency-modulated continuous-wave (FMCW) radar system, comprising:
    a processor; and
    a memory, coupled to the processor, configured to store executable instructions, wherein the instructions, when executed by the processor, cause the processor to:

transmit, using one or more antennas, at least one calibration signal;

receive, using the one or more antennas, a reflection of the at least one calibration signal from a calibration target;

determine, based on the at least one calibration signal, a phase shift factor;

estimate, based on the phase shift factor, a transmitter trace distance and a receiver trace distance;

transmit, using the one or more antennas, at least one target signal;

receive, using the one or more antennas, a reflection of the at least one target signal from a target; and determine, based on the at least one target signal and the transmitter trace distance and the receiver trace distance, a range of the target, wherein determining the range of the target further comprises determining an added phase difference using equation $$2\pi \frac{(d_1 - d_2)S\tau}{2c}$$

for each antenna, where d is a distance of each antenna from either the transmitter or the receiver, c is a speed of the at least one target signal transmitted by the radar system, S is a slope of the at least one target signal transmitted by the radar system, and $\tau$ is a delay of the received reflection of the at least one target signal.

11. A method for operating a phased array frequency-modulated continuous-wave (FMCW) radar system, comprising:

transmitting, using a plurality of antennas, at least one calibration signal via a transmitter of the radar system, wherein the plurality of antennas are respectively connected to the transmitter by wiring connections having respective transmitter trace lengths Dt1, . . . Dtn;

receiving, using the plurality of antennas, a reflection of the at least one calibration signal from a calibration target via a receiver of the radar system, wherein the antennas are respectively connected to the receiver by wiring connections having respective receiver trace lengths Dr1, . . . Drn;

determining, based on the at least one calibration signal, a phase shift factor for each of the plurality of antennas;

estimating, based on the phase shift factor, the transmitter trace distances Dt1, . . . Dtn and the receiver trace distances Dr1, . . . Drn;

transmitting, using the plurality of antennas, at least one target signal toward a target other than the calibration target;

receiving, using the plurality of antennas, a reflection of the at least one target signal from the target; and determining, based on the at least one target signal and the estimated transmitter trace distances and the estimated receiver trace distances, a range of the target.

12. The method of claim 11, further comprising performing, based on the range of the target, beamforming.

13. The method of claim 11, wherein the determining of the phase shift factor is further based on at least one of:

a temporal characteristic of transmission of the at least one calibration signal; and a temporal characteristic of reception of the at least one calibration signal.

14. The method of claim 11, wherein the calibration target is a known distance away from the plurality of antennas.

15. The method of claim 11, wherein the calibration target has at least one of a known size and a known shape.

16. The method of claim 11, wherein the plurality of antennas comprises at least two antennas.

17. The method of claim 11, wherein the plurality of antennas comprises less than sixty antennas.

18. A method for operating a phased array frequency-modulated continuous-wave (FMCW) radar system, comprising:

transmitting, using one or more antennas, at least one calibration signal;

receiving, using the one or more antennas, a reflection of the at least one calibration signal from a calibration target;

determining, based on the at least one calibration signal, a phase shift factor;

estimating, based on the phase shift factor, a transmitter trace distance and a receiver trace distance;

transmitting, using the one or more antennas, at least one target signal;

receiving, using the one or more antennas, a reflection of the at least one target signal from a target; and determining, based on the at least one target signal and the transmitter trace distance and the receiver trace distance, a range of the target, wherein determining the range of the target further comprises determining an added phase difference using equation $$2\pi \frac{(d_1 - d_2)S\tau}{2c}$$

for each antenna, where d is a distance of each antenna from either the transmitter or the receiver, c is a speed of the at least one target signal transmitted by the radar system, S is a slope of the at least one target signal transmitted by the radar system, and $\tau$ is a delay of the received reflection of the at least one target signal.

* * * * *